United States Patent [19]
Carson et al.

[11] Patent Number: 5,242,207
[45] Date of Patent: Sep. 7, 1993

[54] WINDOW PROTECTOR

[75] Inventors: Dale E. Carson, Murrieta; Jerry L. Farrar, Banning, both of Calif.

[73] Assignee: Transit Care, Riverside, Calif.

[21] Appl. No.: 994,104

[22] Filed: Dec. 21, 1992

[51] Int. Cl.$^5$ .............................................. B60J 1/00
[52] U.S. Cl. ....................... 296/146.15; 160/DIG. 2; 52/203
[58] Field of Search .............. 296/146 R, 95.1, 97.1, 296/146 M; 160/21, 269, 370, DIG. 2; 52/203

[56] References Cited

U.S. PATENT DOCUMENTS

| | | | |
|---|---|---|---|
| 1,977,899 | 10/1934 | Shapiro et al. | 52/203 |
| 2,267,542 | 12/1941 | Walz | 52/203 |
| 2,371,430 | 3/1945 | De Patto | 52/171 |
| 3,140,115 | 7/1964 | Bliss | 296/95.1 |
| 3,266,560 | 8/1966 | Mooskian | 52/171 |
| 3,312,023 | 4/1967 | Zell | 52/203 |
| 3,656,798 | 4/1972 | Dodgen et al. | 296/84.1 |
| 3,704,563 | 12/1972 | Waller | 52/455 |
| 3,923,339 | 12/1975 | McDonald | 296/95.1 |
| 4,196,545 | 4/1980 | Korany et al. | 49/463 |
| 4,280,414 | 7/1981 | Allshouse et al. | 52/203 |
| 4,331,359 | 5/1982 | Sheldon | 296/95.1 |
| 4,474,403 | 10/1984 | Miller | 296/96 |
| 4,562,666 | 1/1986 | Young, III | 49/62 |
| 4,726,149 | 2/1988 | Tryba | 49/465 |
| 4,763,454 | 8/1988 | Brockhaus | 52/202 |
| 4,768,823 | 9/1988 | Martinez | 296/95.1 |
| 5,002,326 | 3/1991 | Westfield et al. | 296/95.1 |

FOREIGN PATENT DOCUMENTS

2038176 9/1971 Fed. Rep. of Germany ........ 52/202

*Primary Examiner*—Robert R. Song
*Attorney, Agent, or Firm*—Knobbe, Martens, Olson & Bear

[57] ABSTRACT

Anti-vandalism sheets for the interior of public transportation vehicle windows are provided and comprise flexible yet sturdy protective sheets of acrylic and selected brackets for securing the sheet to the interior of a motor vehicle window. A plurality of fixed brackets are positioned about three of the four edges of the window, having one portion connected to a window frame housing the motor vehicle window and a second portion sufficiently distanced from the surface of the window to accommodate the thickness of the sheet for securing the sheet adjacent the windows. A selectively removable retaining bracket is positioned on the edge of the window unoccupied by the fixed brackets.

18 Claims, 7 Drawing Sheets

WINDOW PROTECTOR

BACKGROUND OF THE INVENTION

The present invention relates generally to a replaceable and cost effective window protector for the inside of motor vehicles. More particularly, the present invention relates to a replaceable sheet of transparent plastic placed against the interior side of a public transportation vehicle window to economically counteract vandalism such as graffiti, scratches, etc.

Vandalism on public transportation vehicle windows is a major concern due to the time and expense incurred by having to constantly replace these windows. Such vandalism occurs from paint, magic markers or scratches from any sharp instrument. Vandalized windows are aesthetically unappealing, dangerous and costly due to the resultant inoperability of the bus. The graffiti may also convey undesirable messages, and impair visibility through the windows.

The interior of a public transportation vehicle is more susceptible to vandalism than the exterior. A crowded bus can create a great opportunity for a vandal to inflict damage on the interior side of the bus window. The exterior side of the bus window is less suspectable to vandalism due to the fact that a bus is constantly in transit when exposed to the public. When the bus is stationary, it is usually enclosed in a gated area.

Further, protecting the interior side of a public transportation vehicle presents different problems than the exterior side. The interior of a bus cannot have any components with jagged or sharp edges or corners that could injure a person, or catch and tear clothing. This is not as serious a concern with the exterior of the bus.

Many prior devices have been used to protect the outside of windshields, as for example U.S. Pat. No. 5,002,326, issued to Westfield, et al., which discloses a protective device using multiple layers of polycarbonate film adhesively attached to the outside of a vehicle windshield, or Martinez (U.S. Pat. No. 4,768,823) which uses two-sided adhesive tape and silicon rubber seal around the periphery of a windshield protector.

Readily removable mechanically held covers for the outside of windshields are also disclosed in U.S. Pat. No. 3,266,560 issued to Mooskian, which has a gap between the cover and the sheet to trap heated air, and U.S. Pat. No. 3,140,115 issued to Bliss which has snap buttons to hold a flexible sheet to inhibit ice and snow from freezing to the windshield. A bullet-proof window protector is disclosed in U.S. Pat. No. (3,923,339) to McDonald.

To the extent these prior patents are even applicable to the inside of motor vehicle windows, they disclose attachments for the protective sheet which are disadvantageous, too easily removed by vandals, ineffective or otherwise unsuitable for deterring vandalism to the inside of windows. There is thus a need for vandalism inhibitory protective covering.

The prior devices are also not compatible with certain public transportation vehicle windows having sides with limited accessibility from the inside of the vehicle. One example is a window configuration where two windows overlap and slide adjacent each other such that in a closed position, one edge of one of the windows is not accessible. There is thus a need for a vandal inhibiting device, wherein a protective sheet can be attached and removed without access to both sides of the window.

Thus, there is a need for a public transportation window protector which is economical to use, easy to replace and pragmatically applicable to counteract vandalism on the interior of public transportation vehicles. Further, there is a need for such a device or method which places a protective sheet securely adjacent the window and is applicable to windows having sides with limited accessibility.

SUMMARY OF THE INVENTION

A replaceable protective acrylic sheet is provided for the inside of a window of a public transportation vehicle such as buses, trains, etc. to inhibit vandalism and reduce the cost of vandalism. The vandal may mark the protector, but not the underlying window glass. The protector comprises a flexible, transparent sheet of plastic of substantially the same size as the vehicle window, which is secured adjacent the inside of the vehicle window by a set of brackets affixed to the window frame, with a retaining bracket being selectively removable. The protective sheet is initially fitted in between the fixed brackets and the window. Once the sheet is fully conformed over the inside of the window, the selectively removable retaining bracket is installed to completely secure the sheet in place and inhibit unwanted removal. Preferably the protective sheet abuts the window over the entire surface of the window that is exposed to the inside of the vehicle. In one embodiment, the protective sheet may be shaped so that it bows slightly with the center being urged against the window to reduce the movement between the window and the sheet.

The protective sheet will protect the expensive window against vandalism such as graffiti, etching, gouging, etc. The protective sheet may advantageously be made of acrylic. When the acrylic sheet is damaged, the old sheet can be removed, and a new sheet inserted. The acrylic sheet is less expensive to replace than the window, and the replacement time is less, thus providing a lower cost protection system. Because the retaining bracket is preferably the only component that is selectively removable, replacement of the present window protector is not time consuming, but sufficient to deter dismantling by vandals.

DETAILED DESCRIPTION OF THE PREFERRED EMBODIMENT

Figure 1:
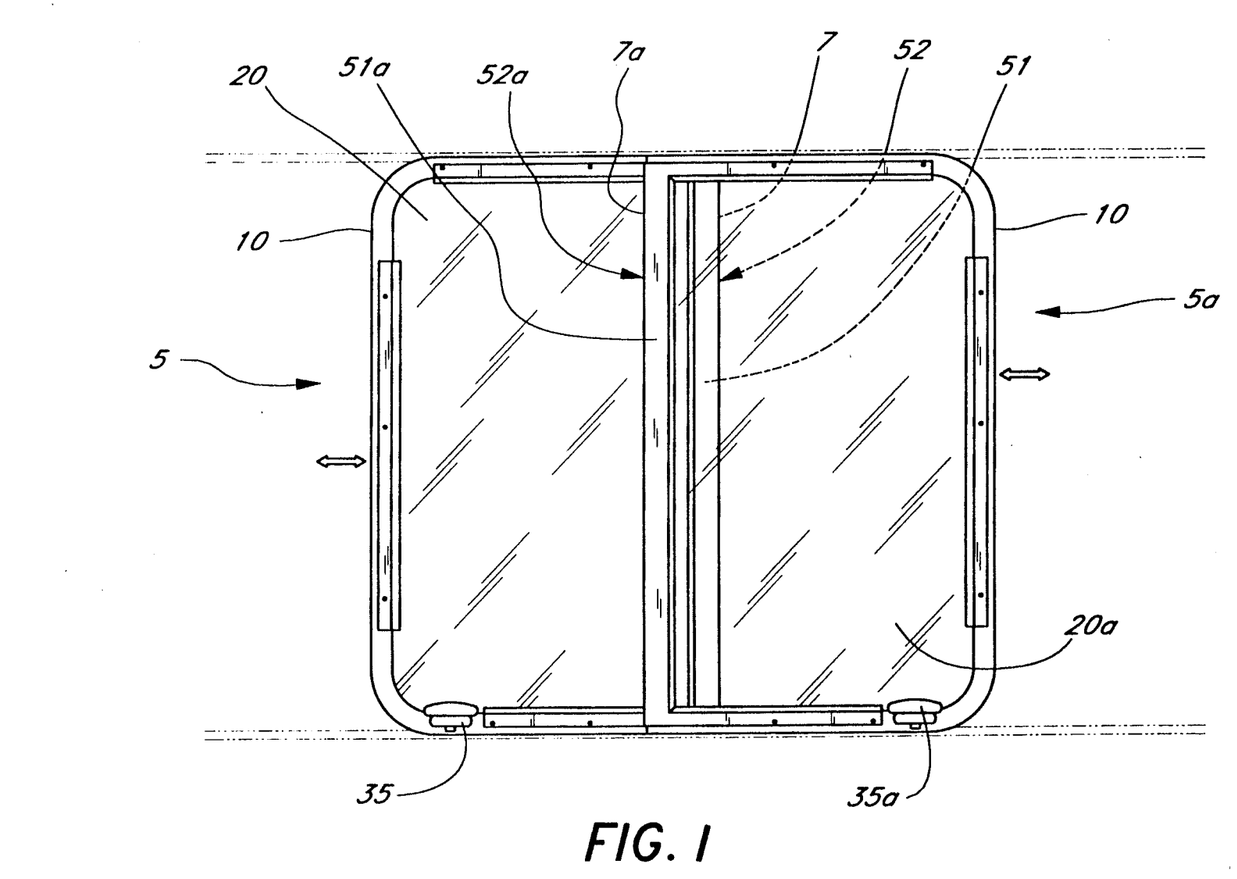
FIG. 1 is a side elevational view of a window configuration embodying two window protector assemblies of the present invention in a sliding window assembly.
Figures 2, 3:
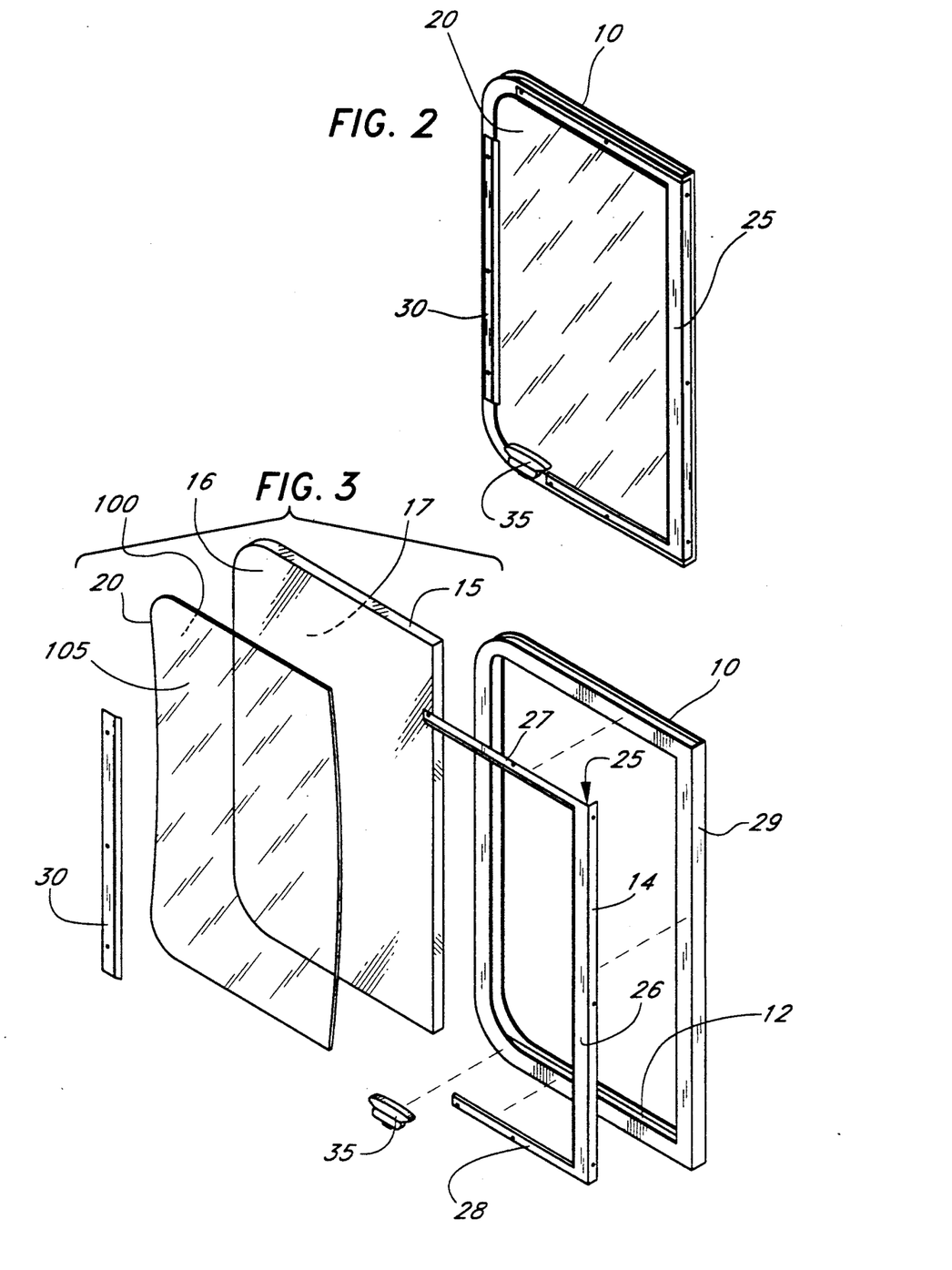
FIG. 2 is a perspective view of one of the window protector assemblies shown in FIG. 1.
FIG. 3 is an exploded view of one of the window protector assemblies in FIG. 1.
Figures 4, 5, 6:
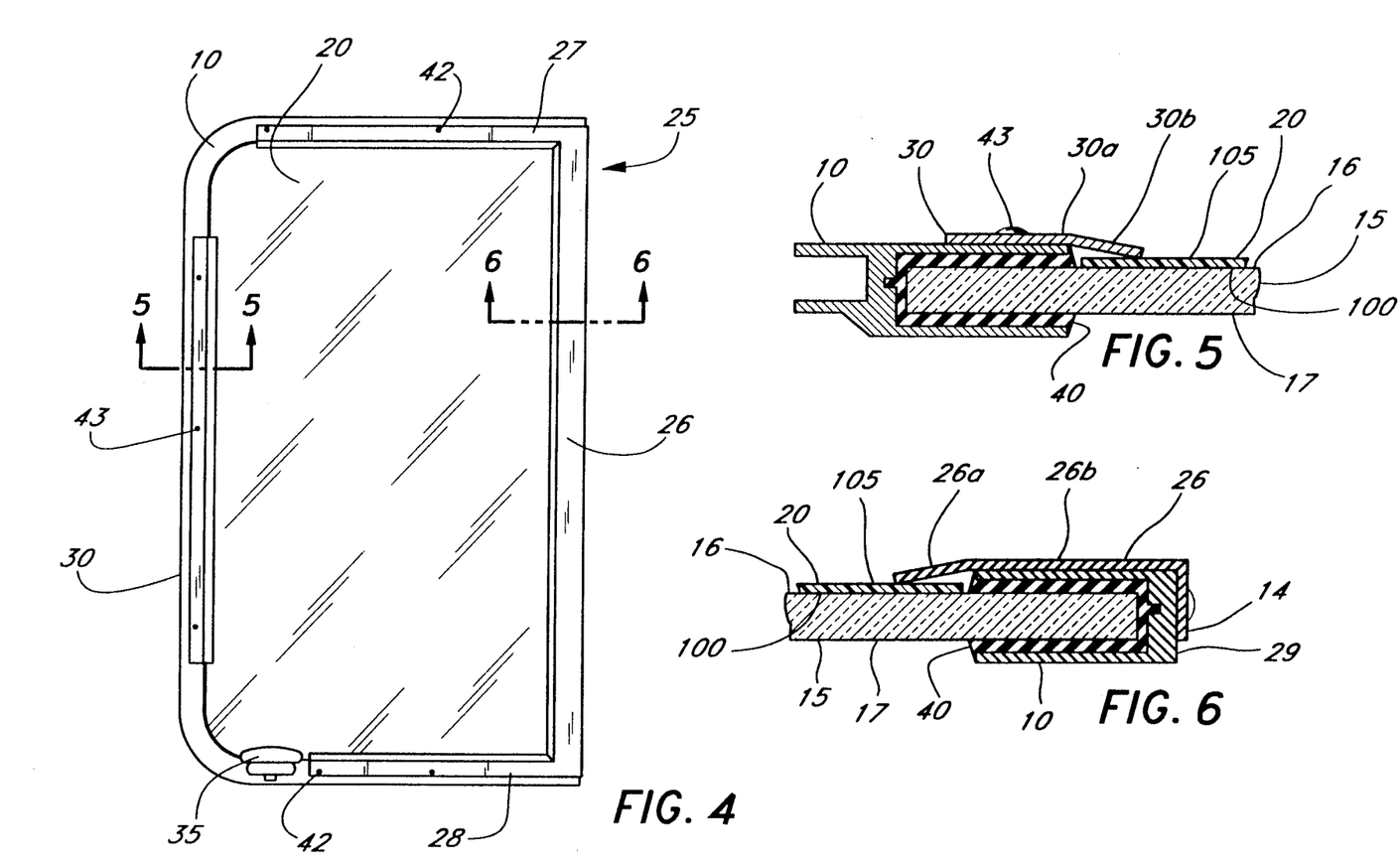
FIG. 4 is side elevational view of one of the window protector assemblies of FIG. 1.
FIG. 5 is a cross-sectional view taken along lines 5—5 of FIG. 4.
FIG. 6 is a cross-sectional view taken along lines 6—6 of FIG. 4.
Figure 7:
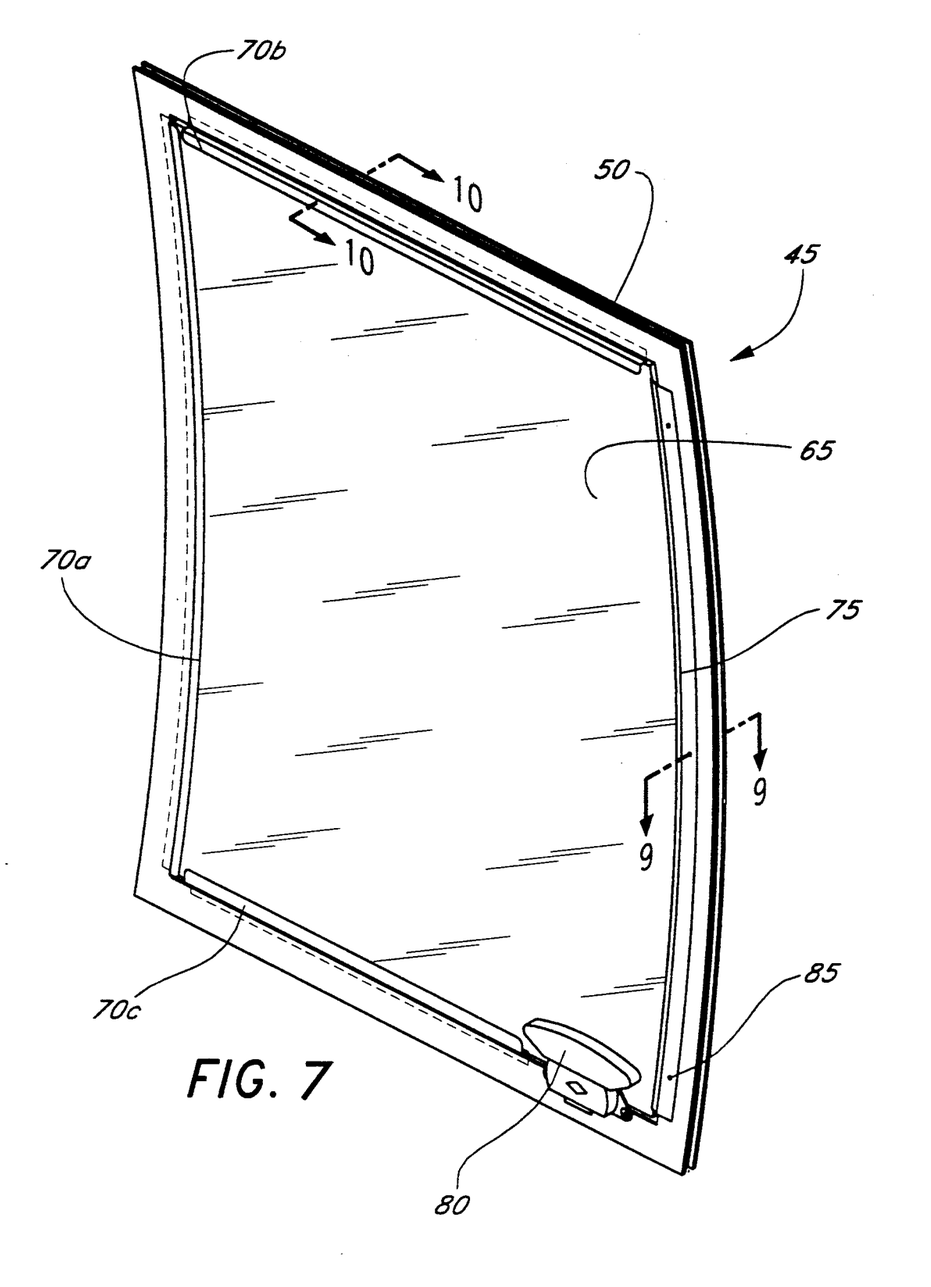
FIG. 7 is a perspective view of an alternate embodiment of the window protector assembly of the present invention.
Figure 8:
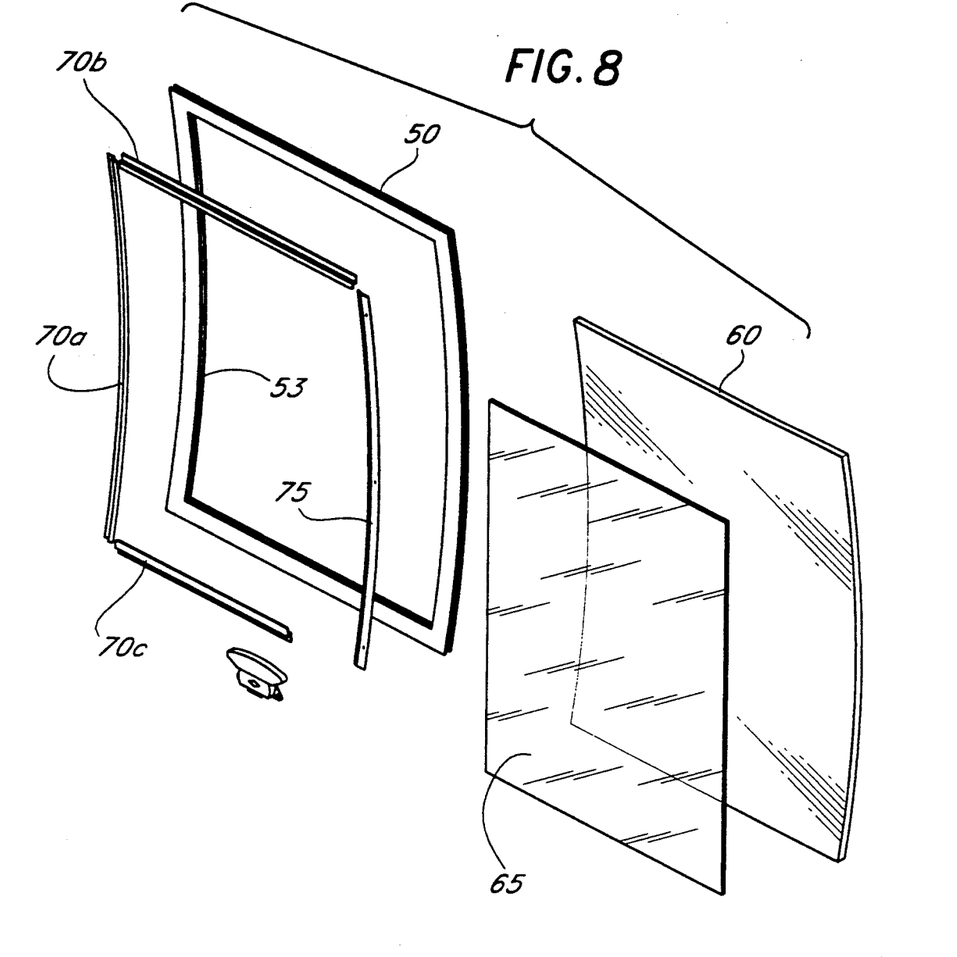
FIG. 8 is an exploded view of the window protector assembly of FIG. 7.

FIGS. 2–6 disclose a D-shaped, generally flat or planar window frame 10 used in numerous public transportation vehicles. The frame 10 is fitted into a corresponding opening (not shown) in the public transportation vehicle, shaped to conform to the outer peripheral shape of two frames 10 positioned adjacent each other, as shown in FIG. 1. The construction of such motor vehicles and their window frames is known in the art and not described in detail here. The frame 10 is generally rectangular, but two corners are rounded to give it a "D" shape. The frame 10 forms an interior channel 12 along the interior periphery of the frame 10 as shown in FIG. 3. A D-shaped vehicle window 15 is housed or held by the channel 12. As shown in FIGS. 5 and 6, a foam rubber seal 40 is advantageously inserted in the channel 12 of the frame 10 between the window 15 and the window frame 10, along the entire outer periphery of the window 15, to resiliently support and pad the periphery of window 15 within the window frame 10. A latch 35, operable to selectively slide the frame 10 relative to the public transportation vehicle (not shown), is connected to the lower end of the frame 10, as shown in FIG. 4.

In one application, the dimensions of the D-shaped frame 10 are approximately 35"×28"×0.5". The dimensions of the window 15 are slightly smaller. The outer periphery of the vehicle window 15 is substantially the same shape as the inner periphery of the window frame 10. The window 15 has a first surface 16 facing the interior of the vehicle and a second surface 17 facing the exterior of the vehicle. In this embodiment, the window 15 and the window frame 10 are substantially planar. The frame 10 can be made out of metal or any suitable material, while the window 15 is preferably be made out of glass.

A transparent sheet 20 of plastic is removably secured over the window 15 for protection against vandalism. The sheet 20 is preferably of acrylic thick enough to inhibit marking of the window 15 by vandals. Advantageously, the sheet 20 is also thick enough so that it is self supporting and will not bow or buckle under its own weight so as to pull away from the window 15 under its own force. The sheet 20 is substantially the same size and shape as the window 15. In one application, the sheet is approximately 33"×24¼"×1/10". The sheet is flexible for ease in installation and removal. However, the sheet 20 should be sturdy enough to effectively protect against vandalism and to maintain its shape against the window 15. Although the sheet 20 is substantially transparent, it is possible to have the sheet 20 slightly tinted.

The sheet 20 has a first surface 100 facing the inside surface 16 of the window 15, and a second surface 105 facing the interior of the vehicle. Advantageously, the acrylic sheet 20 is pre-curved by methods known in the art and is not described in detail herein, such that the first surface 100 is slightly convex when positioned adjacent the window 15. As will be discussed later, having the sheet 20 curved allows for a more secure fit between the window 15 and the sheet 20. In this application, the radius of curvature is approximately 3 feet. However, any radius of curvature would be sufficient as long as the sheet 20 has a bend large enough to create a snug fit between the sheet 20 and the window 15, yet not so large that the insertion and removal of the sheet 20 is difficult, and not so large as to damage the sheet 20 when it is installed.

The protective sheet 20 is secured over the window 15 by a fixed bracket 25 and a selectively removable retaining bracket 30. The fixed bracket 25 is generally C-shaped, as shown in FIGS. 3 and 4, and corresponds to the top, straight side and bottom of the D-shaped frame 10. In this embodiment, the fixed bracket 25 is a unitary body with an elongated vertical leg 26, an elongated top horizontal leg 27 and an elongated bottom horizontal leg 28. However, it is conceivable to have the fixed bracket 25 separated into three separate, individual elongated elements.

For the previously specified frame 10, the length of the vertical leg 26 is about 34.6", and the lengths of the top and bottom horizontal legs 27 and 28 are 17.5"and 14.5", respectively. Each leg 26, 27, 28 of the bracket 25 encloses a substantial length (over half) of the corresponding edge of the sheet 20. The fixed bracket 25 is preferably secured to three adjacent sides of the window frame by threaded fasteners, such as screws or bolts 42. Preferably, these screws 42 are tamper-proof so as to discourage any attempt by vandals to remove this bracket 25. However, other known fastening methods, such as welding or integrally forming the bracket into the window frame 10, can be used.

Referring to FIGS. 5 and 6, the three parts 26, 27 and 28 all have straight or flat sections 26b, 27b, 28b juxtaposed parallel to the plane of frame 10. The length of the straight section 26b of the vertical leg 26 is 1.5", as shown in FIG. 6, while the lengths of the straight sections 27b, 28b of the horizontal legs 27, 28 are 0.75"each. The straight sections 26b, 27b, 28b are integrally formed with edges 26a, 27a and 28a which angle towards the surface of the window 15. The length of the edges 26a, 27a and 28a is approximately ⅜". In this application, the fixed bracket 25 is made of 18-gauge metal, with the tapered edges 26a, 27a, 28a bending away from the plane of frame 10 toward the window 15 at an angle of about 20°.

The angled edges 26a, 27a and 28a are spaced from the surface of the window 15 by an amount sufficient to accommodate protective sheet 20, as shown in FIG. 6. When the sheet 20 is positioned adjacent the window 15, the angled 20 edges 26a, 27a and 28a abut and secure the protective sheet 20 next to, and preferably against, the window 15. The edges 26a, 27a and 28a thus form holding edges to hold the sheet 20 next to, and preferably against the window 15.

Referring to FIG. 6, the vertical leg 26 of the bracket 25 has an additional integrally formed section 14 which wraps around the back edge 29 of the window frame 10. The wrap around section 14 is perpendicular to the straight or flat section 26b, as shown in FIG. 6. The length of the wrap around section 14 is approximately 9/16".

Referring to FIGS. 2–5, a retaining bracket 30 is selectively attachable to the side of the window frame 10 which is unoccupied by the fixed bracket 25. Threaded fasteners, such as screws 43 with either a slotted head or a Phillips head, may be used. Preferably, the screws 23 are tamper-resistant so as to discourage any attempt to remove this bracket 30. Any fastener with an unusually shaped recess to receive the appropriate tool would suffice. In one embodiment, an allen-head type of fastener can be utilized.

The removable retaining bracket 30 comprises an elongated member which has flat or straight section 30a that is planar to the frame 10. The straight section 30a is integrally formed with an edge 30b which is bent away from the plane of the straight section 30a at an angle of about 20°, so that when the sheet 20 is positioned over the window 15, the edge 30b abuts the surface of the protective sheet 20 for securing the sheet 20 against the window 15.

The elongated bracket 30 secures a substantial portion (over half) of the length of the adjacent edge of the sheet 20. For the above-dimensioned frame 10, the dimensions of the removable bracket 30 are approximately 28"×1". The retaining bracket 30 is also of 18-gauge metal. The lengths of the straight section 30a and the bent edge 30b are 0.75" and 0.375", respectively, as shown in FIG. 5.

FIG. 1 shows a window configuration wherein two window protector assemblies 5, 5a are juxtaposed such that they are capable of sliding adjacent each other. Levers 35 and 35a are positioned in the interior of the vehicle on the bottom of the assemblies 5 and 5a and are operable to selectively open and close the assemblies 5 and 5a. When both windows are closed, the edges 7 and 7a of each window containing the vertical legs 51, 51a of the fixed brackets 52, 52a, are aligned next to each other and overlap. In this embodiment, edge 7a overlays side 7 when viewed from the interior of the motor vehicle. This configuration allows for the easy opening of either window, but does not allow for easy access to edge 7 of the window assembly 5 which lies behind the window assembly 5a. The lever 35 prevents sliding of window assembly 5a past the window assembly 5 to access edge 7. Thus, in this configuration, the operator does not have easy access to edge 7 of the window protector assembly 5 in applying and removing the sheet 20.

Referring to FIGS. 3-6, in operation, the protective sheet 20 is inserted in between the tapered edges 26a, 27a, 28a of the fixed bracket 25 and the vehicle window 15. The sheet 20 is inserted from the edge of the window assembly 5 opposite side 7 as shown in FIG. 1. This is necessary due to the limited accessibility of edge 7.

Once the sheet 20 is slid over the entire outer periphery of the window 15, the removable bracket 30 is positioned and secured onto the window frame 10 via threaded fasteners such as screws 43. The brackets 25, 30 substantially enclose the edges of the sheet 20 along the periphery of the sheet. When the sheet 20 gets damaged, the removable bracket 30 is removed and the old sheet is replaced with a new sheet. Since the retaining bracket 30 is the only reusable component which is removed, the replacement of the protective sheet 20 is fast and easy relative to removing and replacing the entire window glass, yet not so easily done as to encourage vandals to dismantle the frame.

Because the sheet 20 is slightly curved and the window 15 is straight, the sheet 20 is initially bent straight during installation so that it will conform to the planar shape of the window 15. Having the sheet 20 curved provides better support between the window 15 and the sheet 20 and will minimize movement between the two. The slight bow in the sheet 20 causes the sheet 20 to tend to curve back to its original curved shape, which causes the center of the sheet 20 to be urged against the window 15, creating a snug fit and reducing movement of the sheet relative to the window 15. The length of time that the sheet 20 will maintain its curved shape will depend in part on the method used to initially pre-curve the sheet 20. In one application, the (pre-described 3-foot radius of curvature) bow in the sheet 20 should last approximately 6 months, which should be longer than the life expectancy of the sheet 20 due to the high vandalism rate.

Referring back to FIG. 1, the installation of sheet 20 to the window assembly 5a is performed substantially the same way, with the exception that edge 7a is accessible.

FIGS. 7-10 disclose an alternate embodiment of a window protector assembly 45, showing a substantially rectangular, yet curved, vehicle window frame 50 of the type commonly used on bus windows. A substantially rectangular, yet curved, vehicle window 60 is housed within an interior channel 53 of the window frame 50. The surrounding bus containing multiple windows is known in the art and has been omitted for clarity. The frame 50 is mounted in the bus by means known in the art and is thus not discussed further.

Figure 9:
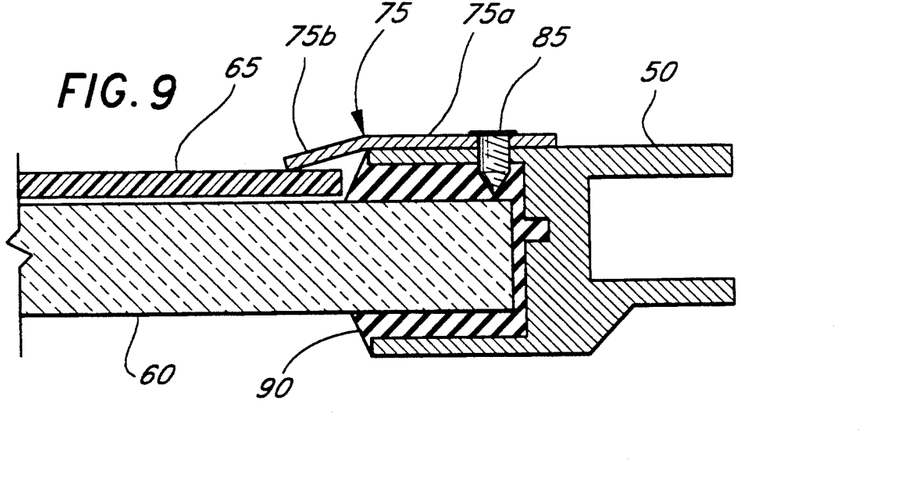
FIG. 9 is a cross-sectional view taken along lines 9—9 of FIG. 7.

One representative example of the window protector assembly 45 of the present invention is illustrative. Frame 50 conforms to the outer periphery of the window 10. In this embodiment, the window 60 and the window frame 50 are similarly curved and have a radius of curvature of approximately 6 feet. The dimensions of the frame 50 for a common window 60 are approximately 33"×27.5"×0.6". The dimensions of the window 60 will be slightly smaller. A foam rubber seal 90 as shown in FIGS. 9 and 10 is inserted in the channel 53 between the frame 50 and the window 60 along the entire outer periphery of the window 60 to resiliently support and pad the window 60.

The window protector includes a rectangular, substantially planar flexible sheet 65 of acrylic substantially conforming to the peripheral shape of the window 60 visible from the inside of the vehicle in which the window is mounted. For the above-dimensioned window, the size of the sheet 65 is approximately 30⅜"×24 5/16"×0.168".

Figure 10:
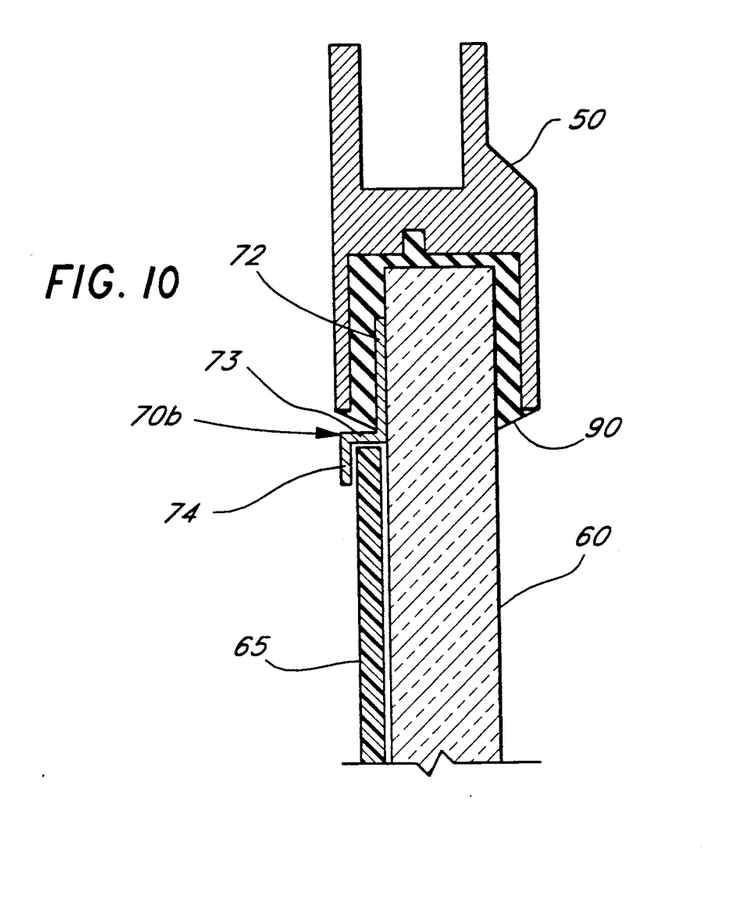
FIG. 10 is a cross-sectional view taken along lines 10—10 of FIG. 7.

The sheet 65 is secured over the window 60 via three elongated, fixed brackets 70a, 70b and 70c, each of which has a generally Z-shaped cross section, as best seen in FIG. 10, and one selectively removable retaining bracket 75. It is also believed possible to have brackets 70a, 70b, 70c form an integral body integrally formed as one piece with the frame 50.

The elongated brackets 70a, 70b and 70c are positioned along three adjacent sides of the window frame 50. Bracket 70b is representative of the construction of all three brackets 70a, 70b, 70c. As shown in FIG. 10, the bracket 70b has a securing leg 72 and a holding or retaining leg 74. The securing leg 72 and retaining leg 74 are planar with the frame 50, but offset from each other. Legs 72, 74 are connected by a vertical section 73 juxtaposed perpendicular to the legs 72, 74. The securing leg 72 of the bracket 70b is inserted between the window 60 and the rubber seal 90.

It is important that the securing leg 72 is sufficiently long to securely maintain its position in between the seal 90 and the window 60. The length of the securing leg 72 is approximately 0.6" for the above-dimensioned window. The retaining leg 74 is distanced from the surface of the window 60 sufficiently to allow the sheet 65 to be inserted between the retaining leg 74 and the window 60. For the above-dimensioned window, the retaining leg 24 is approximately 0.3" long and offset about 0.1" from the securing leg 72 for a sheet 65 about 0.7 inches thick.

The removable bracket 75 is selectively securable to the side of the window frame 50 unoccupied by brackets 70a, 70b and 70c via threaded fasteners such as screws 85, as shown in FIG. 9. These screws 85 are advantageously like screws 42, 43 previously described.

The retaining bracket 75 is an elongated member with a flat section 75a which is planar with the frame 50 and is integrally formed with a holding or retaining edge 75b which bends toward and abuts the surface of the sheet 65 to secure the sheet 65 adjacent to, and preferably against, the interior surface of the window 60. The thickness, width and bend dimensions of the retaining bracket 75 in this embodiment are substantially similar to the retaining bracket of the previous embodiment, and will not be repeated.

For installation, the protective acrylic sheet 65 is slid in-between the retaining legs 74 of the Z brackets 70a, 70b and 70c and the window 60. The holding or retaining legs 74 hold the sheet 65 next to the window 60, and preferably urge it against the window. Because the window 60 and the window frame 50 are curved and the sheet 65 is straight, the sheet 65 is initially bent to conform to the curved shape of the window 60. The bending force that is created between the sheet 65 and the window 60 due to the curvature of the window 60 and the frame 50 will resiliently urge the sheet 65 against the window 60 to create better support and minimize the movement between the window 60 and the sheet 65.

When the sheet 65 is placed over the entire exposed interior surface of the window 60, the retaining brackets 70a, 70b, 70c enclose three sides of the sheet. Bracket 75 is then placed to enclose the sheet 60 and secured onto the frame 50 via screws 85. Replacement of a sheet 65 which has been vandalized requires the removal of the retaining bracket 75, sliding out the old sheet 65, sliding back in a new sheet, and reinstalling the bracket 75.

Figure 11:
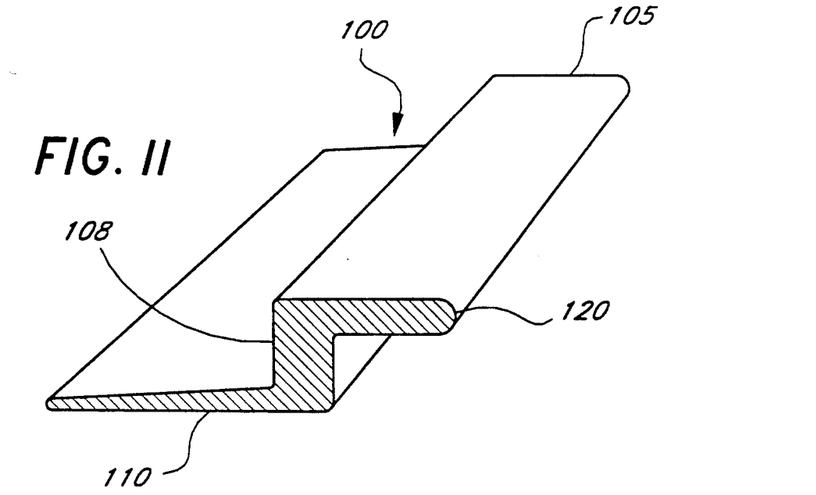
FIG. 11 is a perspective view of an alternate embodiment of the z-clip of FIG. 7.
Figure 12:
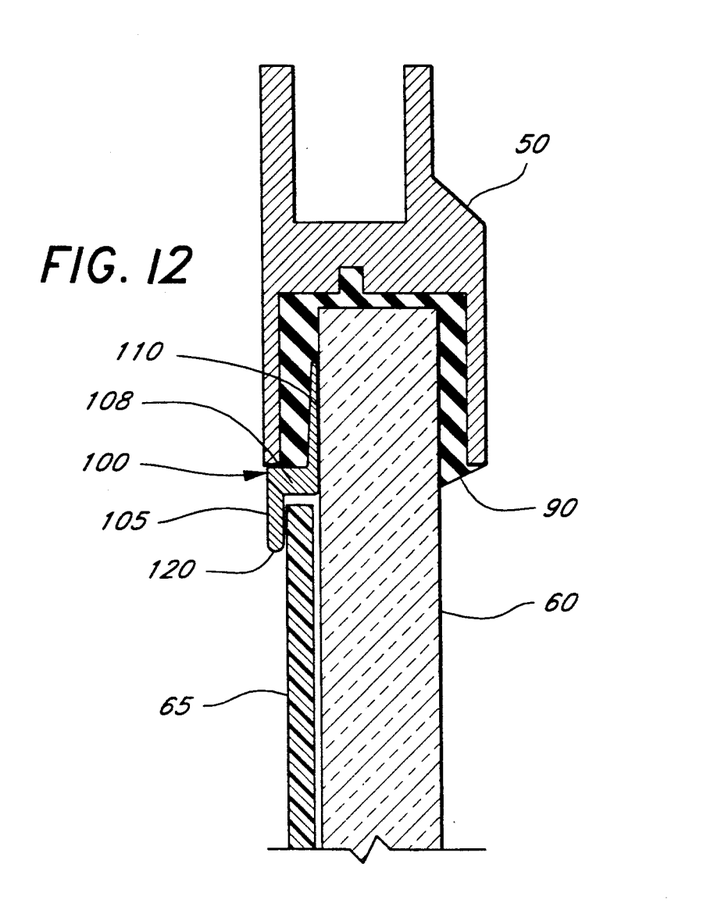
FIG. 12 is a cross-sectional view of the window protector assembly utilizing the z-clip of FIG. 11.

Referring to FIGS. 11 and 12, an alternative embodiment of the z-bracket 100 is disclosed. The bracket 100 has a Z-shaped cross section with a retaining leg 105 and a securing leg 110. The securing leg 110 and the retaining leg 105 are planar with frame 50, but offset from each other. The legs 105, 110 are connected by a vertical section 108 which is perpendicular to the legs 110, 105. The retaining leg 105 is distanced from the surface of the window 60 by an amount sufficient to accommodate the thickness of the sheet 65, as shown in FIG. 12. Edge 120 of the retaining leg 105 is rounded to prevent anything from getting caught and torn on this edge 120. The thickness of the securing leg 110 gradually tapers as it proceeds away from the vertical section 108 in order to aid in the insertion of the z-bracket 100 in between the seal 90 and the window 60.

Although particular embodiments of the present invention have been described and illustrated herein, it should be recognized that modifications and variations may readily occur to those skilled in the art, and that such modifications and variations may be made without departing from the spirit and scope of my invention, as defined in the following claims.

We claim:

1. An apparatus for protecting the interior side of a rectangular motor vehicle window held in a frame connected to a motor vehicle, comprising:
    a generally rectangular, transparent sheet of material sized to substantially conform to the peripheral shape of the inside of said window of said motor vehicle;
    a fixed bracket along three of the edges of said rectangular window, said fixed bracket being attached to said frame of said window on the inside of said motor vehicle, said fixed bracket being spaced from said window to allow the insertion of said sheet between said bracket and said window such that said bracket holds the edges of said sheet next to said window along three edges of said window; and
    a removable bracket along the fourth edge of said rectangular window, said removable bracket being attached to said frame of said window on the inside of said motor vehicle, said fixed and said removable brackets substantially enclosing the edges along the four sides of said sheet to captivate said sheet within said brackets and prevent removal of said sheet, said removable bracket allowing insertion and removal of said sheet.

2. An apparatus as defined in claim 1, wherein said removable bracket comprises an elongated member having a first portion selectively connectable to said window frame for securing said sheet adjacent said window and a second portion bent toward said window but spaced from said window a distance sufficient to accommodate said sheet.

3. An apparatus as defined in claim 1, wherein said fixed bracket comprises a plurality of elongated members with a Z shaped cross section, having one leg of said Z being inserted between said window glass and said window frame in order to hold said bracket in place and with said other leg of said Z being spaced from said window a distance sufficient to accommodate said sheet of material.

4. The apparatus as defined in claim 3, wherein said other leg of said Z is rounded so as to prevent snagging and tearing of a passenger or his clothing.

5. An apparatus as defined in claim 1, wherein one of said sheet or window is pre-curved so that said sheet cooperates with at least one of said brackets to bend said sheet and resiliently urge said sheet against said window.

6. An assembly for protecting the inside surface of a generally rectangular motor vehicle window held in a frame connected to a motor vehicle, comprising:
    a transparent sheet of material having a periphery which conforms to the periphery of the inside of said motor vehicle window;
    an elongated fixed bracket mounted to the inside of said motor vehicle around three of the four sides of said window, said bracket being configured and positioned so that it encloses substantial portions of each of three edges of said transparent sheet when said sheet is inserted into the bracket, said fixed bracket having a first portion selectively connectable to said window frame for securing said sheet adjacent said window and a second portion bent toward said window but spaced from said window a distance sufficient to accommodate said sheet, an edge of said second portion being rounded so as to prevent the catching and tearing of a passenger or his clothing; and an elongated retaining bracket removably mounted to the inside of said motor vehicle and positioned to enclose and hold at least a substantial portion of the fourth side of said sheet after said sheet is inserted in between said window and said elongated bracket.

7. An assembly as defined in claim 6, wherein said sheet of material is pre-curved so that said sheet cooperates with at least one of said brackets to resiliently urge said sheet against said window.

8. An assembly as defined in claim 6, wherein said window is curved, and said sheet is planara in its unrestrained state, such that said sheet cooperates with at least one of said brackets to resiliently urge said sheet against said window.

9. An assembly as defined in claim 6, wherein said elongated fixed bracket is fastened to the inside of said motor vehicle by a plurality of threaded fasteners having a recess adapted to receive a tool to fasten and unfasten said fasteners, wherein said recess configuration is other than a slot and other than a recess for a phillips screwdriver.

10. An assembly for protecting the inside of a motor vehicle window, comprising:

a transparent, flexible sheet substantially conforming to the peripheral shape of said window;

a first bracket having one portion fastened to a frame holding said window, said bracket being fastened on the inside of said vehicle and having another portion positioned along a plurality of edges of said window on the inside of said motor vehicle, but distanced away from the surface of said window by an amount sufficient to accommodate the edges of said sheet so as to hold said sheet adjacent said window when said sheet is inserted in between said bracket and said window; and a second bracket having one portion selectively fastened to said frame on the inside of said motor vehicle, and another portion positioned over said window on the inside of said motor vehicle and distanced from the surface of said window by an amount sufficient to accommodate an edge of said sheet so as to hold said sheet adjacent said window when said bracket is fastened along an edge of said inserted sheet, said second bracket cooperating with said first bracket to allow removal and insertion of said sheet into said first bracket when said second bracket is selectively removed, said second bracket being selectively fastened by means for inhibiting unfastening by vandals.

11. An assembly as defined in claim 10, wherein said window is rectangular in shape, and where said first bracket encloses three sides of said rectangular window, with said second bracket selectively enclosing the remaining side of said window.

12. An assembly as defined in claim 10, wherein said sheet is pre-curved, and wherein a portion of said brackets cooperate with said sheet to urge said sheet against said window.

13. An assembly as defined in claim 10, wherein said first bracket includes a plurality of members having a generally Z shaped cross-section with a first leg of said Z positioned in between said window and a rubber seal of said frame of said window and a second leg of said Z positioned over said window and distanced away from the surface of said window to retain said sheet adjacent said window when said sheet is inserted in between said brackets and said window.

14. An assembly as defined in claim 13, wherein an edge of said second leg of said Z is rounded to prevent the inadvertent tearing of a passenger or his clothing.

15. A method of protecting an interior side of a motor vehicle window against vandalism, comprising the steps of:

placing a plurality of first brackets on the inside of said motor vehicle window about three sides of the periphery of said window;

inserting a substantially transparent and flexible sheet in between said window and said first brackets such that one surface of said sheet is adjacent said window on the interior of said motor vehicle, and the other surface of said sheet has three sides abutting said first brackets; and placing a second bracket on a side of said sheet unoccupied by said first brackets to securely retain said sheet against said window on the interior of said motor vehicle.

16. The method as defined in claim 15, comprising the further step of pre-curving one of said sheet or window to provide a more secure interface between said sheet and said window, when said sheet is retained adjacent said window by said first and second brackets.

17. The method as defined in claim 15, wherein the step of placing said first bracket comprises inserting one portion of said first bracket between said window and a rubber member adjacent said window to fasten said first bracket to said frame.

18. The method as defined in claim 15 comprising the further step of inhibiting unwanted removal of the second bracket by using a plurality of vandalism-discouraging fasteners to retain said second bracket, the fasteners being formed with at lest one recess adapted to receive a tool to fasten and unfasten said fasteners, wherein said recess configuration is other than a screwdriver slot and other than a recess for a phillips screwdriver.

* * * * *